United States Patent [19]

Bergthaller et al.

[11] 4,334,013

[45] Jun. 8, 1982

[54] USE OF COPOLYMERS IN THE PRODUCTION OF PHOTOGRAPHIC EMULSIONS AND PHOTOGRAPHIC MATERIALS

[75] Inventors: Peter Bergthaller; Helmut Sommer, both of Cologne, Fed. Rep. of Germany

[73] Assignee: AGFA-Gevaert AG, Leverkusen, Fed. Rep. of Germany

[21] Appl. No.: 206,155

[22] Filed: Nov. 12, 1980

[30] Foreign Application Priority Data

Nov. 17, 1979 [DE] Fed. Rep. of Germany ....... 2946465

[51] Int. Cl.³ ................................................. G03C 1/72
[52] U.S. Cl. .................................... 430/569; 430/627; 430/630
[58] Field of Search ..................... 430/627, 630, 569

[56] References Cited

U.S. PATENT DOCUMENTS

| 3,084,132 | 4/1963 | Shashova | 430/569 |
| 3,284,207 | 11/1966 | Stonham | 430/627 |
| 3,813,257 | 5/1974 | Hollister et al. | 430/627 |
| 3,860,428 | 1/1975 | Ponticello et al. | 430/629 |

*Primary Examiner*—Jack P. Brammer
*Attorney, Agent, or Firm*—Connolly and Hutz

[57] ABSTRACT

Copolymers obtained by polymerizing an allyl ammonium salt, a monomer containing at least one anionic group and acrylamide and/or methacrylamide are useful as peptizing agents for silver halide emulsions.

7 Claims, No Drawings

USE OF COPOLYMERS IN THE PRODUCTION OF PHOTOGRAPHIC EMULSIONS AND PHOTOGRAPHIC MATERIALS

This invention relates to new polymers, to a process for their production, to their use in the production of photographic emulsions and to photographic materials containing the polymers according to the invention.

The precipitation of photographic silver halide emulsions is generally carried out using gelatin as the peptising agent. Gelatin has excellent protective colloid properties, is capable of reversible gel formation and acts as a halogen acceptor in the elementary photographic process.

However, the use of gelatin is also known to involve disadvantages. As a natural product, gelatin is difficult to produce in a constant quality so far as the photographically important properties are concerned and is vulnerable to attack by microbes and enzymes. In addition, it undergoes rapidly advancing hydrolytic degradation at elevated temperatures and at pH-values differing significantly from the neutral point. Accordingly, the use of gelatin involves limitations in the conditions under which emulsions are precipitated. In addition, gelatin undergoes dimensional changes when exposed to varying temperature and moisture conditions. Finally, the use of gelatin involves limitations in regard to the potential crystallographic and photographic properties of the silver halide crystals, for example in regard to crystal form, crystal growth and grain size distribution.

These disadvantages have frequently prompted attempts to replace gelatin completely or partly by synthetic peptising agents. Thus, it is known that polyvinyl pyrrolidone and polyvinyl alcohol are suitable for use as protective colloids, but inhibit the growth of silver halide crystals to a considerable extent. Copolymers of acrylamide and its derivatives are proposed as peptising agents in U.S. Pat. No. 2,811,494. Polyacrylamide itself has an inadequate protective colloid effect. To improve the protective colloid effect, it is possible to use corresponding copolyacrylamides containing groups with an affinity for silver halide which are incorporated through special comonomers during the copolymerisation process.

The use of copolymers containing thioether groups as a peptising agent for photosensitive photographic silver halide emulsions is known from German Offenlegungsschrift No. 1,904,147 and from U.S. Pat. No. 3,860,428.

By contrast, gelatin contains only a very small number of thioether groups and owes its good protective colloid effect towards silver halide largely to the presence of nitrogen-containing basic groups.

German Offenlegungsschrift No. 2,506,405 describes copolymers containing aminomethyloxy-alkyl acrylate or methacrylate units as monomers imparting an affinity for silver. The amino groups contained therein are derived from dialkyl amines and saturated heterocyclic amine compounds and, accordingly, are tertiary amino groups.

U.S. Pat. No. 3,084,132 describes copolymers of dimethyl aminoethyl methacrylate or diethyl aminoethyl methacrylate. These copolymers, too, contain only tertiary amino groups.

U.S. Pat. No. 3,813,251 describes ionic copolymers of 1-vinyl imidazole and/or 1-vinyl-2-methyl imidazole which are distinguished by an excess of acid monomer units in relation to the basic units. In the above German Offenlegungsschrift copolymers containing N-acrylamidoalkyl-morpholine or N-methacrylamido morpholine units are described. In these copolymers, too, there is a skeleton which solely contains tertiary amino groups as basic functions.

Although copolymers of vinyl amine are known, they are difficult to produce in a form in which they can be used for photographic purposes. In this connection, reference may be made to the article by Bloys van Treslong and Morra in Rec. Trav. Chim. Pays Bas 94, 5, pages 101 et seq (1975), and to R. Hart, Makromol. Chem. 32, 51 (1959).

A process for producing copolymers containing allyl amine units is described in U.S. Pat. No. 2,949,442. However, this process is commercially unsatisfactory.

It is an object of the present invention to provide new polymers which avoid the disadvantages of known polymers. More particularly, an object of the present invention is to provide synthetic peptising agents for photographic silver halide emulsions which agents are capable of completely or partly replacing gelatin, particularly in the precipitation of the silver halide, and the use of which leads to improved photographic properties of the silver halide emulsions. More particularly, the developability, storability, susceptibility to pressure desensitization and the speed vs. fog ratio of the emulsion are to be improved by comparison with an emulsion prepared with gelatin.

This invention therefore provides:
(1) new copolymers characterised by a content of a copolymers of at least the following polymerized compounds:
(1) an allyl ammonium salt corresponding to the following formula

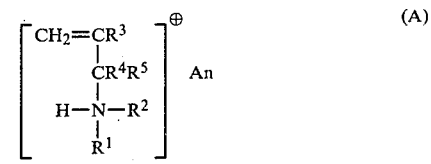

in which
R$^1$ and R$^2$ which may be the same or different, represent hydrogen; an aliphatic, araliphatic or cycloaliphatic radical preferably containing up to 20 carbon atoms which may be substituted, in particular by hydroxyl, C$_1$–C$_{12}$ alkoxyl, C$_6$–C$_{10}$ aryloxy groups, C$_1$–C$_{12}$ acyloxy groups, C$_1$–C$_{12}$ acylamino groups, C$_1$–C$_{12}$ alkyl or aryl ureido groups, —COOH, —CONH$_2$—, COO-alkyl (containing from 1 to 12 carbon atoms), —CN, —Cl, —Br, —SO$_3^-$,

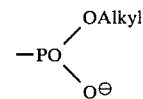

or

R$^1$ and R$^2$ together form the ring members required to complete a 5- to 7-membered ring, more particularly a pyrrolidone, piperidine, perhydroazepine, morpholine or thiomorpholine ring which may be substituted, R$^3$, R$^4$ and R$^5$ which may be the same or different, represent hydrogen, alkyl, which may be substituted more particularly $C_1$–$C_4$ alkyl, especially methyl, An is an anion, particularly the anion of a strong inorganic or organic acid, particularly chloride; alkane sulphonate; aryl sulphonate; trifluoroacetate; perfluoroalkanoate; perfluoroalkane sulphonate or the sulphonate group of a monomer present in copolymerised or copolymerisable form; and/or $R^3$ represents the radical [—$CR^5R^4$—$NR^1R^2H$]+An (2) a monomer B containing at least one anionic group, preferably a monomer corresponding to the following formula:

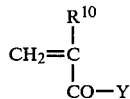

in which $R^{10}$ represents hydrogen; alkyl, particularly $C_1$–$C_4$; an alkyl radical which may be substituted by a carboxyl, alkyloxycarbonyl or, optionally, a substituted carbamoyl group, more particularly: $CH_3$, —$C_2H_5$, —$CH_2$—COOH, —$CH_2$—COO—$R^{11}$ or

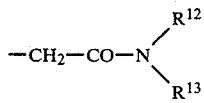

$R^{11}$ represents $C_1$–$C_{12}$ alkyl, $C_1$–$C_{15}$ alkoxy alkyl or a residue of an alkyl polyglycol corresponding to the following formula

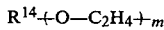

$R^{12}$ and $R^{13}$ may be the same or different and represent hydrogen, $C_1$–$C_{12}$ alkyl or, may together represent the atoms required to complete a pyrrolidine, piperidine, morpholine, thiamorpholine, 1-alkyl piperazine or perhydroazepine ring, $R^{14}$ represents a primary $C_1$–$C_4$ alkyl group, Y represents hydroxyl; an alkoxy or alkylamino radical, particularly one containing from 2 to 8 carbon atoms in the alkyl radical which may be substituted by a solubilising group, more particularly a COOH-, $SO_3H$- or OH-group, especially

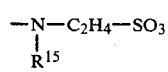

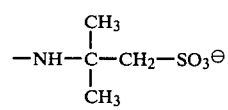

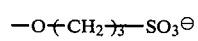

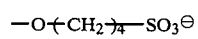

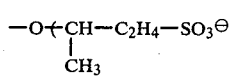

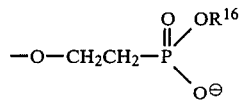

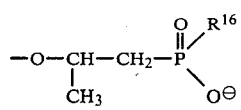

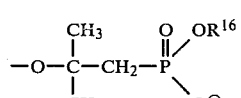

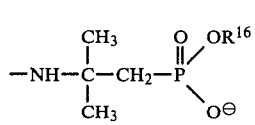

$R^{15}$ represents hydrogen or $C_1$–$C_4$ alkyl, $R^{16}$ represents hydrogen, methyl, ethyl or chloroethyl, m is an integer, more particularly from 2 to 10; and (3) at least 40 mole percent, preferably from 40 to 65 mole percent, of a compound C which is acrylamide and/or methacrylamide.

In a preferred embodiment:

$R^1$ represents hydrogen; $C_1$–$C_{12}$ alkyl which may be substituted by a phenyl, alkoxy or anionic group, more particularly by a sulpho group; allyl or cyanoethyl;

$R^2$, $R^3$, $R^4$ and $R^5$ represent hydrogen;

$R^{10}$ represents hydrogen or methyl;

Y represents hydroxyl; and

An represents chloride, sulphate, methane sulphonate, benzene sulphonate, p-toluene sulphonate, methane phosphonate, monoalkyl methane phosphonate or trifluoroacetate.

In a preferred embodiment, polymerized compounds A and B are present in the following molar ratios, based on the polymer as a whole:

Compound A: 5 to 30%, preferably 10 to 20%

Compound B: 10 to 40%, preferably 15 to 30%.

In a particularly preferred embodiment, the copolymer contains from 5 to 25 mole percent, based on the polymer, of polymerised units of an alkyl acrylate and-/or methacrylate containing from 2 to 8 carbon atoms in the alkyl radical. Butyl acrylate is preferred.

The copolymers may additionally contain other polymerised monomer fractions which preferably make up no more than 20 mole percent of the total polymer. This residue may be formed by any ethylenically unsaturated polymerised monomers, although it is preferably formed by the following polymerised monomers: N-vinyl imidazoles; N-vinyl pyrazoles; N-vinyl lactams; more particularly 1-vinyl imidazole; 1-vinyl-2-methyl imidazole; 1-vinyl-2-isopropyl imidazole; 1-vinyl-3,5-dimethyl pyrazole; N-vinyl pyrrolidone; N-vinyl caprolactam; N-vinyl-N-ethyl formamide; N-vinyl-N-ethyl acetamide and N-vinyl-N-alkyl amides of simple aliphatic monocarboxylic acids in a molar quantity of no more than 15 mole percent, preferably less than 10 mole percent, based on the total monomer, hydroxy alkyl acrylates or methacrylates in a quantity of no more than 15 mole percent; acrylonitrile or methacrylonitrile in a quantity of no more than 5 mole percent; monomers containing 8-hydroxy quinoline groups in a quantity of no more than 5 mole percent, more particularly

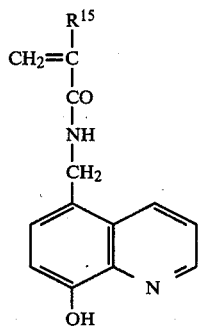

in which $R^{15}$ represents hydrogen or methyl;

N-(perfluoroalkyl)-methyl acrylamides or methacrylamides in a quantity of no more than 5 mole percent;

N-(3,6-dithiaalkyl)-amides of the following unsaturated carboxylic acids: acrylic acid; methacrylic acid; itaconic acid; crotonic acid in quantities of no more than 5 mole percent; 2-vinyl pyridine; 4-vinyl pyridine; 2-methyl-5-vinyl pyridine in quantities of no more than 5 mole percent; vinyl phosphonic acid esters in quantities of no more than 10 mole percent, based on total monomer; vinyl esters of simple aliphatic monocarboxylic acids and, finally, dialkyl esters of maleic acid; itaconic acid; fumaric acid or citraconic acid.

Particularly preferred compounds corresponding to formula A are allyl amine hydrochloride; allyl ammonium methane sulphonate; allyl ammonium trifluoroacetate; allyl ammonium benzene sulphonate; 3-allyl ammonium propane sulphonate; 4-allyl ammonium butane sulphonate; the allyl ammonium salt of 2-acrylamido-2-methyl propane sulphonic acid; the allyl ammonium salt of methacryloyloxy-ethane sulphonic acid; allyl ammonium methyl phosphonate; N-ethyl allyl ammonium ethyl sulphate; cyanoethyl ethyl ammonium chloride; N-hydroxy ethyl allyl ammonium chloride; N-allyl morpholinium chloride, methallyl ammonium chloride and 2-methylene-1,3-bis-alkyl ammonium propane dichlorides.

Particularly preferred compounds B are acrylic acid; methacrylic acid; itaconic acid; dimeric acrylic acid; methacryloyloxy-ethane sulphonic acid in the form of an allyl ammonium, ammonium or alkali metal salt; preferably in the form of the lithium salt, 3-acryloyloxy-propane sulphonic acid, preferably in the form of the lithium salt; 4-acryloyloxy-butane sulphonic acid, preferably in the form of the lithium salt; N-acryloyl-N-methyl taurine, N-acryloyl-N-butyl taurine, preferably in the form of the lithium salt, finally 2-acrylamido-2-methyl propane sulphonic acid, preferably in the form of the allyl ammonium salt.

The present invention also relates (2) to a process for producing the polymers according to the invention in which compounds corresponding to formulae A, B and C are polymerised with one another in the presence of polymerisation initiators and optionally in the presence of solvents. The invention also relates (3) to the process of producing, preferably precipitating silver halide emulsions in the presence of the polymers according to the invention.

For this purpose, a silver salt and a halide are reacted in the presence of the polymer according to the invention to form a silver halide. Production may be carried out by precipitating a silver halide by reacting a water-soluble silver salt, preferably silver nitrate, and a water-soluble halide. In this case, the emulsions may be washed, redispersed and chemically ripened after precipitation. However, production may also be carried out by dissolution and crystallisation to form substantially insoluble silver halide grains from readily soluble silver halide grains in the presence of the polymers according to the invention. The invention also relates (4) to a photosensitive photographic material comprising a support layer and at least one photosensitive silver halide emulsion layer and, optionally, further layers, characterised by the presence of at least one polymer according to the invention. This polymer is preferably present in a silver halide emulsion layer.

The polymers according to the invention contain recurring units of the polymerised compound A which may be present either in salt form (formula $A^1$) or in the amine form (formula $A^2$), depending on the pH-value:

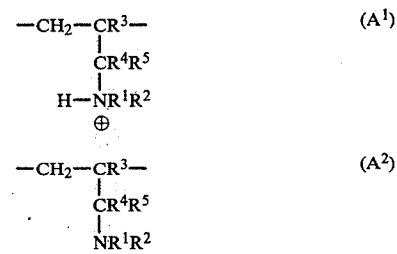

The substituent $R^3$ may occur in the salt form ($R^3=CR^4R^5NR^1R^2H$) or in the amine form ($R^3=CR^4R^5-NR^1R^2$).

The monomers are radical polymerised by radical processes known in principle in the presence of polymerisation initiators. In this connection, reference is made to Ian M. G. Cowie "Chemie und Physik der Polymeren (Chemistry and Physics of Polymers)", page 52, Verlag Chemie, Weinheim 1976; and also to the Chapter entitled "Auslosung der Polymerisation (Initation of Polymerisation)" in Houben-Weyl, Methoden der Organischen Chemie, Vol XIV/1, pages 209 to 297.

Typical initiators suitable for the purposes of the invention are azoisobutyronitrile; 2,2'-azo-bis-(2,4-dimethyl valeronitrile); symmetrical azo-bis-mercapto compounds according to German Offenlegungsschrift No. 2,518,622; di-tert.-butyl peroxide; tert.-butyl cumyl peroxide; dicumyl peroxide; 4,4'-di-tert.-butyl peroxyvaleric acid-n-butyl ester; tert.-butyl peracetate; tert-butyl perpivalate; tert.-butyl perbenzoate; tert.-butyl peroxyisopropyl carbonate; tert.-butyl peroxy-2-ethyl hexanoate; diisopropyl peroxy dicarbonate; dipropionyl peroxide; dioctanoyl peroxide; dilauroyl peroxide; dibenzoyl peroxide; dicyclohexyl peroxy dicarbonate; hydrogen peroxide; peracetic acid; monoperphthalic acid and permaleic acid. The type of initiator used is largely determined by the polymerisation conditions selected and by the type of monomers used.

The optimum initiator may readily be determined by comparison tests. The constitution of the phosphorus compound generally has no bearing on the choice of initiator.

Polymerisation is carried out by the process of precipitation polymerisation, preferably in a refluxing solvent which dissolves all of the monomers. The polymerisation temperature may be varied to a certain extent and, in most cases, is in the range from 80° to 120° C. Suitable polymerisation media are substantially anhydrous or completely anhydrous solvents and mixtures thereof. The following solvents are preferred: methanol (in admixture with relatively high boiling solvents); ethanol; n-propanol; isopropanol; n-butanol; isobutanol; tert.-butanol; acetonitrile; propionitrile; ethyl acetate; butyl acetate; 1,2-dimethoxy ethane; dioxane; 2-methoxy ethanol; dimethyl sulphoxide; N-methyl pyrrolidone; sulpholan; acetic acid; toluene; chlorobenzene or o-dichlorobenzene. The slight chain-transfer effect which some of these solvents have is favourable in many cases in that it suppresses the formation of insoluble or gel-containing polymers.

The copolymers according to the invention generally have an average molecular weight in the range from about 10,000 to 200,000. Copolymers having an average molecular weight of from 20,000 to 50,000 are particularly suitable for use as peptising agents.

In the production of the copolymers suitable for use as peptising agents for silver halide in accordance with the invention, it is also possible to add sulphur-containing compounds which are incorporated into the polymer skeleton.

Preferred sulphur-containing compounds of the type in question are cyclic disulphides corresponding to the following formula

   (I)

in which
W is a difunctional hydrocarbon radical, more particularly alkylene, especially containing from 1 to 9 carbon atoms, or arylene, especially phenylene, or a hydrocarbon radical containing at least one alkylene-arylene group, the alkylene, arylene or alkylene/arylene group optionally being interrupted by at least one heteroatom, particularly —O—, —S—, —NR$^1$—;

R$^I$ represents alkyl, particularly containing from 1 to 8 carbon atoms; acyl; alkoxy carbonyl, particularly containing from 1 to 4 carbon atoms; amino carbonyl; sulphonyl; and also bis-thiols corresponding to the following formula

HS—R$^{II}$—SH   (II)

in which
R$^{II}$ is a difunctional aliphatic or cycloaliphatic radical preferably containing at least two thioether groups.

In a particularly preferred embodiment, the polymers are produced in the presence of a phosphorus compound corresponding to the following formula

   (III)

in which
R$^{20}$ and R$^{21}$ are the same or different and represent hydrogen; alkyl which may be substituted, more particularly containing from 1 to 12 carbon atoms and preferably from 1 to 4 carbon atoms; aryl which may be substituted, particularly phenyl; a hydroxy group; alkoxy, particularly containing from 1 to 12 carbon atoms; aralkyl, particularly benzyl; an aralkoxy group, particularly a benzyloxy group; or R$^{20}$ and R$^{21}$ may together form a group —O—R$^{23}$—O— where R$^{23}$ is an alkylene radical which may be substituted containing no more than 6 carbon atoms; a dialkylamino group where the alkyl radical contains in particular from 1 to 4 carbon atoms; chloride;

R$^{22}$ represents hydrogen; an acyl group which may be substituted, particularly of an aliphatic carboxylic acid containing from 1 to 20 carbon atoms or of an aromatic carboxylic acid, especially acetyl, pivaloyl, butyryl or benzoyl; alkyl, particularly containing from 1 to 12 carbon atoms; a dialkylamino group where the alkyl radical contains in particular from 1 to 4 carbon atoms or chloride;

X is a single electron pair or an oxygen atom, X being an electron pair when none of the radicals R$^{20}$ to R$^{22}$ is hydrogen.

In a preferred embodiment, the phosphorus is present in the oxidation state of +3. Particularly preferred phosphorus compounds, which may be in the form of their salts, are hypophosphorous acid, phosphorous acid, phenyl phosphorous acid, methyl phosphorous acid; the alkyl esters, aralkyl or alkylene esters of phosphorous acid, particularly in the form of the diesters; the alkyl esters of phosphorous acids, for example phenyl phosphorous acid, and finally the phosphine oxides of secondary phosphines. In addition, the abovementioned phosphorus compounds may also be produced in situ by solvolysis reactions from preliminary stages, for example from chlorides, ester chlorides, from phosphorous acid trialkyl esters or from the amides of the corresponding acids of phosphorus.

The role which the phosphorus compounds of formula III play during the polymerisation reaction is not known in detail. It may be assumed that the phosphorus compounds participate in the reaction by reacting with the primary radical resulting from the decomposition of the initiator and represent the actual polymerisation initiators.

In addition, the effect of standard polymerisation regulators, for example isopropanol, is not adversely affected by the presence of the phosphorus compounds of formula III or their precursors from which the actually active compounds III are formed during the polymerisation reaction. The phosphorus compound is added during polymerisation or formed from the precursor in quantities of from 0.2 to 5 mole percent, based on the monomer content of the mixture.

Typical precursors for phosphorus compounds are phenyl dichlorophosphine, diphenyl chlorophosphine, triethyl phosphite, tetraethyl pyrophosphite, hexamethyl phosphorous acid triamide, diethyl chlorophosphite or ethylene chlorophosphite, also acyl phosphonic acid dialkyl esters, for example methacryloyl phosphonic acid diethyl ester (cf. Kabachnik, Rossijskaja Jzv. Akad. SSSR 1965, S 597).

The radical copolymerisation of the monomer mixtures described above in the presence of the phosphorus compounds III is carried out by processes known in principle in the presence of polymerisation initiators. In this connection, reference is made to Ian M. G. Cowie "Chemie und Physik der Polymeren (Chemistry and Physics of Polymers)", page 52.

The process for producing the copolymers according to the invention is illustrated by but by no means limited to the following Examples.

COPOLYMER 1

A solution of 42.6 g (0.6 mole) of acrylamide, 12.8 g (0.1 mole) of butyl acrylate, 10.8 g (0.15 mole) of acrylic acid stabilised with 0.1% of t-butyl hydroquinone, 14 g (0.15 mole) of allyl amine.HCl, 1.0 g of diethyl phosphite in 400 ml of t-butanol and 40 ml of chlorobenzene is added dropwise under nitrogen over a period of 60 minutes with intensive stirring at reflux temperature to a solution of 0.2 ml of tert.-butyl peroctoate in 90 ml of tert.-butanol and 10 ml of chlorobenzene.

0.2 ml of t-butyl peroctoate are then added, followed by refluxing for another 5 hours. After cooling, the copolymer is filtered off under suction, washed with isopropanol and ethyl acetate and dried in vacuo at 60° C. Yield: 71 g (88% of the theoretical).

Analysis: $Cl_{calculated}$: 6.63%: $Cl_{observed}$: 6.0%.

COPOLYMER 2

The procedure is as in Example 1, except that the monomer solution has the following composition: 39 g of acrylamide (0.55 mole), 12.8 g of butyl acrylate (0.1 mole), 17.2 g of methacrylic acid (0.2 mole, freshly distilled over copper(II)acetate), 14.0 g of allyl ammonium chloride, 1.5 g of diethyl phosphite, 400 ml of tert.-butanol, 40 ml of chlorobenzene. Yield: 70 g (84% of the theoretical).

Analysis: $Cl_{calculated}$: 6.32%: $Cl_{observed}$: 5.5%.

COPOLYMERS 3 TO 6

The procedure is as in Example 2, except that the following phosphorus compounds are used instead of diethyl phosphite:

| Phosphorus Compounds | Yield % of th. | $Cl_{calc}$ | $Cl_{observed}$ |
|---|---|---|---|
| Copolymer 3: 5 g C₆H₅—P(=O)(OH)(H) (3 mole %) | 85% | 6.32 | 6.0 |
| Copolymer 4: 1 ml 60% H₃PO₂ | 91% | 6.32 | 5.25 |
| Copolymer 5: 4 g (C₆H₅)₂P(=O)H (2 mole %) | 80% | 6.32 | 4.8 |
| Copolymer 6: cyclic phosphite | 88% | 6.32 | 6 |

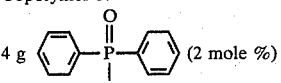
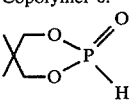

COPOLYMERS 8 TO 10

The monomer composition and the production process were the same as for copolymer 1, except that the following compounds were used as initiators:

| Copolymer | Initiator | Yield | $Cl_{calc}$ | $Cl_{observed}$ |
|---|---|---|---|---|
| 8 | 1g of azo-bis-iso-butyronitrile | 85% | 6.63 | 5.80 |
| 9 | 1g of dibenzoyl peroxide | 81% | 6.63 | 6.05 |
| 10 | 1g of t-butyl perpivalate | 85% | 6.63 | 5.75 |

COPOLYMER 11

The procedure is the same as in Example 1, except that the monomer solution has the following composition: 53.3 g (75 mole percent) of acrylamide, 7.2 g (10 mole percent) of acrylic acid, 14.0 g (15 mole percent) of $C_3H_5NH_2.HCl$, 2.8 g of diethyl phosphite, 600 ml of tert.-butanol, 60 ml of chlorobenzene. Yield: 75 g (100% of theoretical).

$Cl_{calculated}$: 7.17%
$Cl_{observed}$: 7.05%

COPOLYMER 12

The procedure is the same as in Example 1, except that the monomer solution has the following composition: 46.1 g of acrylamide (65 mole percent), 15.8 g of itaconic acid dimethyl ester (10 mole percent), 13.4 g of itaconic acid (10 mole percent), 14.0 g of $C_3H_5NH_2.HCl$ (15 mole percent), 1.5 g of diethyl phosphite, 500 g of tert.-butanol, 50 g of chlorobenzene. Yield: 80 g (90% of the theoretical).

$Cl_{calculated}$: 5.97%
$Cl_{observed}$: 6.05%

COPOLYMER 13

The procedure is the same as in Example 1, except that the monomer solution has the following composition: 39 g of acrylamide (55 mole percent), 12.8 g of butyl acrylate (10 mole percent), 12.9 g of methacrylic acid (15 mole percent), 8.15 g of N-methane sulphonyl methacrylamide (5 mole percent), 14.0 g of $C_3H_5NH_2.HCl$ (15 mole percent), 2.8 g of diethyl phosphite, 400 ml of tert.-butanol, 40 ml of chlorobenzene.

Yield: 79 g (91% of the theoretical).
Analysis: $S_{calculated}$: 1.84%: $S_{observed}$: 1.5%.

COPOLYMER 14

The procedure is the same as in Example 1, except that the monomer solution has the following composition: 35.5 g of acrylamide (50 mole percent), 25.6 g of butyl acrylate (20 mole percent), 31.1 g of 2-acrylamido-2-methyl propane sulphonic acid (15 mole percent), 8.5 g of allyl amine (15 mole percent), 1.5 g of diethyl phosphite, 400 ml of tert.-butanol, 80 ml of chlorobenzene. Yield: 81 g (80% of the theoretical).

Analysis: $S_{calculated}$: 4.77%: $S_{observed}$: 5.0%.

COPOLYMER 15

The procedure is the same as in Example 14, except that the monomer solution and the receiving solution have the following composition:

Monomer solution: 31.9 g (45 mole percent) of acrylamide, 32.1 g (25 mole percent) of butyl acrylate, 31.1 g (15 mole percent) of 2-acrylamido-2-methyl propane sulphonic acid, 8.5 g (15 mole percent) of allyl amine, 400 ml of isopropanol, 250 ml of butyl acetate, 2.8 g of diethyl phosphite.

Receiving solution: 200 ml of isopropanol, 1 g of azo-bis-isobutyronitrile.

Further quantities of 0.2 g of azo-bis-isobutyronitrile are added at hourly intervals during the 5-hour after-stirring period. Yield: 72 g (70% of the theoretical).

COPOLYMER 16

Monomer solution: 42.6 g (60 mole percent) of acrylamide, 14.4 g (20 mole percent) of acrylic acid, 42.4 g (20 mole percent) of N-ethyl allyl ammonium ethyl sulphate, 1.5 ml of diethyl phosphite, 400 ml of t-butanol, 150 ml of chlorobenzene.

Receiving solution: 0.4 ml of t-butyl peroctoate in 150 ml of chlorobenzene.

The monomer solution is added dropwise under nitrogen over a period of 2 hours to the receiving solution which is stirred under reflux. A total of 0.4 ml of t-butyl peroctoate and 0.4 ml of diethyl phosphite is added during the 4-hour after-heating period. The copolymer is filtered under suction when the temperature falls on cooling to 35° C., washed with ethyl acetate and dried in vacuo. Yield: 84 g (85% of the theoretical).

COPOLYMER 17 AND COPOLYMER 18

The procedure is the same as in Example 1, except that the monomer solutions have the following composition:

| Copolymer 17 | 42.6 g (0.6 mole) of acrylamide<br>41.4 g (0.2 mole) of 2-acrylamido-2-methyl propane sulphonic acid<br>11.4 g (0.2 mole) of allyl amine<br>1.4 g (0.01 mole) of diethyl phosphite. |
|---|---|
| Copolymer 18 | 42.6 g (0.6 mole) of acrylamide<br>41.4 g (0.2 mole) of 2-acrylamido-2-methyl propane sulphonic acid<br>11.4 g (0.2 mole) of allyl amine. |

The solutions also contain 450 ml of t-butanol and 50 ml of chlorobenzene.

In contrast to Example 1, a solution of 0.8 g of azo-isobutyronitrile in 50 ml of chlorobenzene is used as initiator. One third of this solution is introduced initially, a second third is added with the monomer solution and the final third is added dropwise during the 5-hour after-heating period. Yields:

Copolymer 17 89 g (93% of the theoretical)
Copolymer 18 80 g (84% of the theoretical).

Copolymer 17 is soluble in 10% aqueous sodium hydroxide without any amine odour, i.e. does not contain any free allyl amine. By contrast, copolymer 18 dissolves in 10% aqueous sodium hydroxide with the liberation of allyl amine (1.4 milli-equivalents of allyl amine per g of polymer) and cannot be used for photographic purposes.

This test demonstrates the superiority of the copolymers produced with phosphorus compounds of formula III in which the allyl ammonium monomer units are completely incorporated.

COPOLYMER 19

The procedure is as in Example 15, except that the monomer solution has the following composition: 42.6 g (60 mole percent) of acrylamide, 11.3 g (20 mole percent) of allyl amine, 41.5 g (20 mole percent) of 2-acrylamido-2-methyl propane sulphonic acid. The yield was quantitative.

COPOLYMER 20

(a) 1,3-bis-ethylamino-2-methylene propane 125 g of 2-chloromethyl-3-chloropropene are added dropwise under reflux to 1000 ml of a 40% ethyl amine solution and 500 ml of methanol. After 2 hours under reflux, the solution is concentrated by evaporation to a volume of 500 ml, alkalised with 80 g of sodium hydroxide and 300 ml of a saturated potassium carbonate solution are added to complete phase separation. The oil phase is separated off, dried with potassium carbonate and fractionated in vacuo. Yield: 100 g (70% of the theoretical) $Bp_{14mb}$: 73°–77° C.

(b) To produce the hydrochloride, HCl is introduced into a solution cooled to 15° C. of 14.2 g of 1,3-bis-ethylamino-2-methylene propane in 100 ml of t-butanol. When the calculated amount has been taken up, the product is precipitated with 300 ml of ethyl acetate, cooled to 0° C. and filtered off under suction. Yield: 22 g of the following compound:

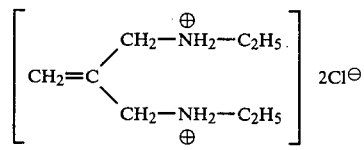

(c) For copolymerisation, 22 g (0.1 mole) of the hydrochloride, 20 g (0.1 mole) of lithium-4-sulphobutyl acrylate and 57 g (0.8 mole) of acrylamide are taken up in 500 ml of 2-methoxy ethanol. The monomer solution and, at the same time, a solution of 1.4 g of diethyl phosphite and 0.5 ml of t-butyl peroctoate in 100 ml of chlorobenzene are added over a period of 1 hour to 200 ml of t-butanol kept under reflux in a nitrogen atmosphere. The reflux temperature gradually rises to 85° C., the polymer precipitating in the form of a white sludge. After 4 hours under reflux, the product is cooled, the polymer is filtered off under suction, washed with ethyl acetate and dried in vacuo. Yield: 90 g Cl: observed <0.2%.

Assuming a hybrid-ionic structure, the yield is quantitative.

COPOLYMER 21

(a) 4-allyl morpholine 60 g of allyl bromide are added dropwise under reflux to a solution of 200 g of morpholine in 400 ml of isopropanol. After 4 hours under reflux, the solution is concentrated in a rotary evaporator and taken up with 100 ml of 20% sodium hydroxide. Phase separation is completed by the addition of 20 g of potassium carbonate, after which the product is separated off and distilled after drying over potassium hydroxide. Yield: 50 g.

For conversion into the hydrochloride, the product is dissolved in 200 ml of t-butanol and HCl is introduced into the resulting solution until it has increased in weight by 20 g. The hydrochloride is precipitated with chlorobenzene and taken up without drying in t-butanol.

(b) For copolymerisation, a monomer solution prepared from half the allyl morpholinium chloride solution (=0.2 mole) produced in (a), 14.4 g of acrylic acid and 42.6 g of acrylamide in 500 ml of t-butanol and, at the same time, a solution of 0.5 ml of t-butyl peroctoate and 1.4 g of diethyl phosphite are added to 200 ml of t-butanol and 100 ml of chlorobenzene kept under reflux in a nitrogen atmosphere. After a polymerisation time of 5 hours, the reaction mixture is cooled to room temperature, the copolymer is filtered off under suction, washed with ethyl acetate and dried in vacuo. Yield: 60 g (67% of the theoretical).

In the production of photographic silver halide emulsions, the polymers according to the invention are preferably used as protective colloid during precipitation. The quantity used is determined by the effect required and may be determined in the usual way by a few simple tests.

The compounds according to the invention may be used in quantities which produce an increase in sensitivity. For example, from 10 to 100% by weight of the peptising agent used as protective colloid during precipitation of the silver halide may consist of the polymer according to the invention, the rest of the peptising agent preferably being formed by gelatin. In general, from 5 to 200 g and preferably from 8 to 40 g of the polymer according to the invention are used per mole of silver halide to be precipitated. In the photographic material the polymer according to the invention is present in an amount of from 500 mg to 500 g per mol of silver halide preferably.

The polymers according to the invention may be used in the form of aqueous solutions. The concentration in the solution is not critical and may vary within wide limits. The polymers are preferably sufficiently soluble in water to make it possible for a sufficiently concentrated aqueous solution to be prepared. For example, it is sufficient to use a 1 to 5% aqueous solution. In the case of substances which have particularly good solubility, the solution may of course be even more concentrated.

In general, the solutions are prepared with a pH-value of the order of 7. However, it is also possible to keep the pH-value of the solution in the mildly acid range, for example in the range from pH 5 to pH 7. In the case of so-called ammonia emulsions, the pH-values of the solution may even be in the range from 7 to 9.

The emulsions may be produced in various ways using the peptising agents according to the invention. The peptising agent is normally added to the halide solution. Where peptising agents free from carboxylate groups or silver salt solutions containing additional complex formers are used, part of the peptising agent may even be added to the silver salt solution without any danger of fog-inducing nuclei being formed.

The silver halide emulsions may be prepared both by the single jet process and also by the double jet process. Suitable processes of this type are described for example in British Pat. No. 1,027,146 and in the article by E. Moisar and S. Wagner in "Berichte der Bunsengesellschaft fur physikalische Chemie", 67 (1963), pages 356 to 359. It is also possible to produce relatively coarse-grained emulsions by dissolving and crystallising fine-grained starting emulsions in the presence of silver complex formers and in the presence of the peptising agents according to the invention. Processes of this type are known for example from U.S. Pat. Nos. 2,146,938; 3,206,313; 3,317,322 and from German Auslegeschrift No. 1,207,791.

According to the invention, emulsions may in principle be produced for a variety of photographic materials such as, for example, negative emulsions having high surface sensitivity; negative emulsions having high internal sensitivity; direct positive emulsions which may be surface fogged; for example the emulsions having a layered grain structure which are known from German Offenlegungsschrift Nos. 2,224,837; 2,308,239 and 2,332,802 and which are described, for example, in the article by E. Moisar and S. Wagner in "Berichte der Bunsengesellschaft fur physikalische Chemie", 67 (1963), 356–359; print-out emulsions; reversal emulsions; emulsions for black-and-white materials and for colour materials and emulsions characterised by a defined grain distribution and halide topography, particularly by a defined halide and, in particular, iodide gradient. Convert emulsions which are known for example from U.S. Pat. No. 2,592,250 may also be produced in accordance with the invention.

The silver halide emulsions according to the invention may consist of pure silver halides and of mixtures of different silver halides. For example, the silver halide grains of the emulsions may consist of silver chloride, silver bromide, silver iodide, silver chlorobromide, silver chloroiodide, silver bromoiodide and silver chlorobromoiodide.

According to the invention, it is possible to precipitate both emulsions having a narrow grain size distribution and emulsions having a relatively wide grain size distribution. In particular, both homodisperse and also heterodisperse silver halide emulsions may be produced in accordance with the invention.

Homodisperse emulsions are understood to be emulsions having a narrow grain size distribution. In homodisperse emulsions, at least 95% of the silver halide grains preferably have a diameter which deviates by no more than 40% and preferably by no more than 30% from the mean grain diameter. The silver halide grains may have any of the known forms, for example cubic, octahedral or even a mixed tetrahedral/decahedral form.

Heterodisperse emulsions are, in particular, emulsions in which at least 10% and preferably at least 20% of the silver halide grains have a diameter which deviates by at least 40% from the mean grain diameter. The silver halide grains of heterodisperse emulsions generally have an irregular form.

To remove the water-soluble salts, the silver halide emulsions may either be hardened, noodled and rinsed with water in known manner after the addition of gelatin or, alternatively, may be coagulated with a coagulating agent and subsequently washed, as known for example from German Offenlegungsschrift No. 2,614,862.

The photographic materials may be developed with standard colour developer substances, for example N,N-dimethyl-p-phenylene diamine; 4-amino-3-methyl-N-ethyl-N-methoxy ethyl aniline; 2-amino-5-diethylamino toluene; N-butyl-N-$\omega$-sulphobutyl-p-phenylene diamine; 2-amino-5-(N-ethyl-N-$\beta$-methanesulphonamido ethylamino)-toluene; N-ethyl-N-$\beta$-hydroxy ethyl-p-phenylene diamine; N,N-bis-($\beta$-hydroxy ethyl)-p-phenylene diamine and 2-amino-5-(N-ethyl-N-$\beta$-hydroxyethylamino)-toluene. Other suitable colour developers are described, for example, in J. Amer. Chem. Soc. 73, 3100 (1951).

The photographic material may contain the usual colour developers which may be incorporated in the silver halide layers themselves. Examples of suitable colour couplers can be found in the article by W. Pelz entitled "Farbkuppler (Colour Couplers)" in "Mitteilungen aus den Forschungslaboratorien der Agfa, Leverkusen/Munchen", Vol. III (1961) and in K. Venkataraman's book entitled "The Chemistry of Synthetic Dyes", Vol. 4, 341 to 387, Academic Press, 1971.

Other suitable colour couplers are 2-equivalent couplers, for example the known DIR couplers. The colour couplers may be added to the photosensitive silver halide emulsions or other casting solutions by standard methods.

Where the colour couplers are water-insoluble and alkali-insoluble compounds, they may be emulsified in known manner. So-called coupler solvents or oil formers may be additionally used for incorporating hydrophobic compounds such as these by emulsification; cf. for example U.S. Pat. Nos. 2,322,027; 2,533,514; 3,689,271; 3,764,336 and 3,765,897.

Gelatin is preferably used as binder for the photographic layers. However, it may be completely or partly replaced by other natural or synthetic binders.

The emulsions may also be chemically sensitised, for example by the addition during chemical ripening of sulphur-containing compounds, for example allyl isothiocyanate, allyl thiourea and sodium thiosulphate. Other suitable chemical sensitisers are reducing agents, for example the tin compounds described in Belgian Pat. Nos. 493,464 or 568,687, also polyamines, such as diethylene triamine or aminomethyl sulphinic acid derivatives, for example according to Belgian Pat. No. 547,323. Other suitable chemical sensitisers are also noble metals and noble metal compounds, such as gold, platinum, palladium, iridium, ruthenium or rhodium. It is also possible to sensitise the emulsions with polyalkylene oxide derivatives, for example with polyethylene oxide having a molecular weight of from 1000 to 20,000 and also with condensation products of alkylene oxides and alcohols, aliphatic carboxylic acids, aliphatic amines, aliphatic diamines and amides.

The emulsions may also be optically sensitised, for example with the usual polymethine dyes, such as neutrocyanines, basic or acid carbocyanines, rhodacyanines, hemicyanines, styryl dyes and oxonoles. Sensitisers such as these are described in F. M. Hamer's book entitled "The Cyanine Dyes and Related Compounds", (1964).

The emulsions may contain the usual stabilisers such as, for example, homopolar or salt-like compounds of mercury with aromatic or heterocylic rings, such as mercapto triazoles, single mercury salts, sulphonium-mercury double salts and other mercury compounds. Other suitable stabilisers are azaindenes, preferably tetra- or penta-azaindenes, particularly those substituted by hydroxyl or amino groups. Compounds such as these are described, for example, in the article by Birr in Z. Wiss Phot. 47 (1952), 2 to 58. Other suitable stabilisers are inter alia heterocyclic mercapto compounds, for example phenyl mercapto tetrazole, quaternary benthiazole derivatives and benzotriazole.

The layers of the photographic material may be hardened in the usual way, for example with formaldehyde or halogen-substituted aldehydes containing a carboxyl group, such as mucobromic acid, diketones, methane sulphonic acid ester and dialdehydes. The photographic layers may also be hardened with epoxides, heterocyclic ethylene imine or acryloyl hardeners. It is also possible to harden the layers by the process according to German Offenlegungsschrift No. 2,218,009 in order to obtain colour photographic materials which are suitable for high-temperature processing. The photographic layers or the colour photographic multilayer materials may also be hardened with diazine, triazine or 1,2-dihydroquinoline hardeners. Examples of hardeners such as these are diazine derivatives containing alkyl or aryl sulphonyl groups; derivatives of hydrogenated diazines or triazines such as, for example, 1,3,5-hexahydrotriazine; fluorine-substituted diazine derivatives such as, for example, fluoropyrimidine; esters of disubstituted 1,2-dihydroquinoline or 1,2-dihydroisoquinoline-N-carboxylic acids. Other suitable hardeners are vinyl sulphonic acid hardeners, carbodiimide or carbamoyl hardeners of the type described, for example, in German Offenlegungsschrifts Nos. 2,263,602; 2,225,230 and 1,808,685; French Pat. No. 1,491,807; German Pat. No. 872,153 and East German Pat. No. 7218. Other suitable hardeners are described for example in British Pat. No. 1,268,550.

APPLICATION EXAMPLE 1

Production of a silver halide emulsion of the micrate type.

The following solutions are prepared:
(1) Halide solution:
    4.9 g of potassium bromide
    0.12 g of sodium chloride
    0.03 g of potassium iodide
    10 ml of a 5% aqueous solution of the polymers indicated in Table 1.
(2) Silver nitrate solution:
    7.2 g of silver nitrate
    10 ml of water The silver nitrate solution tempered at 25° C. is poured onto the halide solution tempered at 25° C. After 1 minute, a smooth dispersion is formed.

4 ml of 5% inert gelatin and 4 ml of 1% polystyrolsulfonic acid are added, the pH is adjusted to 2 with 20% sulphuric acid, the dispersion is left to settle for 2 minutes, decanted and then washed twice with 100 ml of water. The product is then taken up in 50 ml of water at pH 6. According to the results of turbidity measurement, the emulsion has the particle sizes indicated in Table below:

TABLE 1

| Polymer | Particle size |
| --- | --- |
| 1 | ~0.05µ |
| 2 | ~0.05µ |
| 14 | <0.04µ |
| 17 | <0.05µ |
| 16 | ~0.06µ |

APPLICATION EXAMPLE 2

Production of silver bromide-iodide emulsions having a wide grain size distribution:

5% solutions of compounds 1 to 18 are prepared and adjusted to pH 6.5.

3.2 and 5% polymer solutions are added to a solution of 1.56 g of ammonium bromide and 0.12 g of potassium iodide in 10 ml of water. After heating to 65° C., 20 ml of a 0.72 molar silver nitrate solution are added as follows:

1. 6.6 ml in 20 seconds; after a 5 minute interval, another
2. 6.6 ml in 8 minutes and then
3. 6.8 ml in 12 minutes.

After stirring for 10 minutes at 65° C., 5 ml of a 1% gelatin solution and 1 ml of a 1% polystyrene sulphonic acid solution are added, the pH is adjusted to 2.5 with 10% sulphuric acid, the flocculate is allowed to settle, decanted, washed with 20 ml of water, taken up with 25 ml of water and adjusted to pH 6.5. The flocculates redisperse satisfactorily without any residual agglomerate.

APPLICATION EXAMPLE 3

Production of fine-grained silver bromide emulsions by inverse precipitation:

Quantities of 4 ml of 5% aqueous solutions of copolymers 1, 2, 8 and 14 to 16 are adjusted to pH 2 with 10% acetic acid. After tempering to 50° C., 20 ml of a 0.72 molar $AgNO_3$ solution are added and 10 ml of a 1.5-molar ammonium bromide solution (4% bromide excess) are run in over a period of 5 seconds. The average grain size amounts to approximately $0.1\mu$.

Following the addition of 2 ml of a bromide-iodide solution (0.31 g of ammonium bromide and 0.024 g of potassium iodide in 10 ml), the emulsion is digested for 30 minutes at 60° C., the average grain size increasing to $0.4\mu$. After adjustment to pH 7.5 with sodium hydroxide, 1 ml of 10% gelatin and 2 ml of 1% polystyrene sulphonic acid are added and the emulsion is flocculated out by adjusting the pH-value to pH 2 with 10% sulphuric acid.

The flocculate is washed twice with water of pH 2.0, 10 ml of 6% gelatin are added, followed by redispersion at pH 6.5. The flocculates redisperse satisfactorily.

APPLICATION EXAMPLE 4

Sample 4.1 (Comparison)

To produce a silver bromide-iodide gelatin emulsion, the following solutions are prepared:

| Solution A | 3000 ml of water | |
|---|---|---|
| | 305 g of ammonium bromide | |
| | 25 g of potassium iodide | |
| | 48.0 g of inert gelatin | temperature 65° C. |
| Solution B | 4800 ml of water | |
| | 480 g of silver nitrate | temperature 65° C. |

One third of solution B is poured uniformly over a period of 1 minute into solution A, followed by digestion for 10 minutes at 65° C., after which the remainder of solution B is run in over a period of 30 minutes at 65° C. After cooling to 20° C., 40 ml of a 10% aqueous polystyrene sulphonic acid solution are then added and the pH-value is reduced with sulphuric acid (25%) in pH 3.0, resulting in flocculation of the emulsion.

The flocculate is left to settle, after which the supernatant solution is poured off. For chemical ripening, the flocculate is dissolved in 22,000 ml of a 10% aqueous gelatin solution (pH 7.5) at 40° C.

After the flocculate has been dissolved, the solution is adjusted to pH 6.5 and a suitable quantity of standard sulphur ripeners and gold salts is added, followed by ripening at 55° C. to full speed. 100 ml of a 5% aqueous solution of saponin, 100 ml of a 10% aqueous solution of formaldehyde and 220 ml of a 1% methanolic solution of 4-hydroxy-6-methyl-1,3,3a,7-tetraazaindene are then added per kg of emulsion, after which the emulsion is cast onto a cellulose acetate support layer. After exposure behind a step wedge in a standard sensitometer and development (for 7 and 16 minutes at 20° C.) in a developer having the following composition:

| | |
|---|---|
| Sodium sulphite sicc. | 70.0 g |
| Borax | 7.0 g |
| Hydroquinone | 3.5 g |
| p-Monomethyl aminophenol sulphate | 3.5 g |
| Sodium citrate | 7.0 g |
| Potassium bromide | 0.4 g | made up with water to 1 liter the results obtained are evaluated sensitometrically.

Samples 4.2–4.12, invention

These emulsions are prepared in the same way as sample 4.1, except that the entire quantity of gelatin in solution A is replaced successively by quantities of 32 g of the polymers indicated in Table 2. After precipitation of the silver halide, 100 g of gelatin are added in the form of a 10% aqueous solution, after which the emulsion is flocculated with polystyrene sulphonic acid and by reducing the pH-value with sulphuric acid to 3.0. The further treatment is carried out in the same way as described for sample 4.1.

TABLE 2

| | | Fresh Material | | | | Stored Material | | |
|---|---|---|---|---|---|---|---|---|
| Sample No. | Polymer No. | 7 mins. E | development S | 16 mins. E | development S | 16 mins. E | development S | $\sigma_{D=1.0}$ |
| 4.1 | (gelatin) | 100 | 0.11 | 164 | 0.14 | 185 | 0.21 | 4.1 |
| 4.2 | 1 | 100 | 0.09 | 176 | 0.11 | 185 | 0.15 | 4.7 |
| 4.3 | 2 | 116 | 0.12 | 177 | 0.16 | 174 | 0.18 | 4.3 |
| 4.5 | 3 | 125 | 0.12 | 160 | 0.14 | 160 | 0.18 | 4.0 |
| 4.5 | 7 | 104 | 0.10 | 176 | 0.12 | 160 | 0.12 | 4.5 |
| 4.6 | 8 | 84 | 0.09 | 100 | 0.10 | 112 | 0.14 | 4.2 |
| 4.7 | 11 | 152 | 0.11 | 180 | 0.14 | 170 | 0.18 | 4.9 |
| 4.8 | 12 | 100 | 0.08 | 125 | 0.10 | 115 | 0.13 | 4.3 |
| 4.9 | 14 | 80 | 0.10 | 100 | 0.14 | 95 | 0.16 | 3.6 |
| 4.10 | 16 | 90 | 0.09 | 100 | 0.10 | 105 | 0.15 | 3.7 |
| 4.11 | 17 | 80 | 0.08 | 84 | 0.10 | 95 | 0.12 | 3.6 |
| 4.12 | 19 | 84 | 0.08 | 90 | 0.09 | 90 | 0.10 | 3.6 |

In Table 2:

E: represents the relative sensitivity, based on the standard with 100 units; a doubling of E corresponds to a doubling of sensitivity;

S: represents the fog value;

$\sigma D=1$ represents the graininess, as measured by Altmann's method, Applied Optics 3,35 (1964), behind a pinhole diaphragm $29\mu$ in diameter (the dimensionless value has to be multiplied by $10^{-2}$).

The results show that, compared with sample 4.1, the emulsions prepared with the polymers according to the invention show more favourable graininess. With lower sensitivity by comparison with the gelatin standard, the advantages of graininess are particularly distinct.

After storage in a heating cabinet (for 72 hours at 60° C./40% relative air humidity), all the emulsions produced with polymers according to the invention show a lower increase in fogging (≦0.05) than the gelatin standard.

The changes in sensitivity ΔE are also lower in terms of absolute value.

We claim:

1. A photographic material comprising a support and at least one photosensitive silver halide emulsion layer on said support comprising a peptizing agent and at least one silver halide wherein the improvement comprises said photosensitive layer includes a peptizing agent comprised of a copolymer of at least the following polymerized compounds:

(1) An allyl ammonium salt corresponding to the following formula

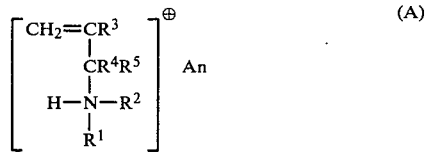

in which

R$^1$ and R$^2$ which may be the same or different, represent hydrogen; an aliphatic, araliphatic or cycloaliphatic radical which may be substituted, or R$^1$ and R$^2$ may together represent the atoms required to complete a 5- to 7-membered ring;

R$^3$, R$^4$ and R$^5$ which may be the same or different, represent hydrogen or an alkyl radical which may be substituted;

An represents an anion and/or R$^3$ represents the radical (—CR$^5$R$^4$—NR$^1$R$^2$H)+An;

(2) a monomer B containing at least one anionic group; and (3) at least 40 mole percent of a compound C which is acrylamide and/or methacrylamide; wherein the copolymer has a molecular weight of from 10,000 to 200,000 and the polymer is present in a quantity of from 500 mg to 500 g per mole of silver halide.

2. A process for the production of a photosensitive silver halide emulsion comprising precipitation of a silver halide by reacting a water-soluble silver salt and a water soluble halide in the presece of a peptizing agent or comprising dissolution and crystalization to form substantially insoluble silver halide grains from readily soluble silver halide grains in the presence of a peptizing agent wherein the improvement comprises said photosensitive emulsion includes a peptizing agent comprised of a copolymer of at least the following copolymerized compounds:

(1) An allyl ammonium salt corresponding to the following formula

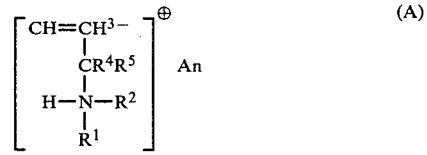

in which

R$^1$ and R$^2$ which may be the same or different, represent hydrogen; an aliphatic, araliphatic or cycloaliphatic radical which may be substituted, or R$^1$ and R$^2$ may together represent the atoms required to complete a 5- to 7-membered ring;

R$^3$, R$^4$ and R$^5$ which may be the same or different, represent hydrogen or an alkyl radical which may be substituted;

An represents an anion and/or R$^3$ represents the radical (—CR$^5$R$^4$—NR$^1$R$^2$H)+An;

(2) a monomer B containing at least one anionic group; and (3) at least 40 mole percent of a compound C which is acrylamide and/or methacrylamide; wherein the copolymer has a molecular weight of from 10,000 to 200,000 and the polymer is present in a quantity of from 500 mg to 500 g per mole of silver halide.

3. The process of producing a silver halide emulsion as claimed in claim 2 characterized in that in the copolymer based on the polymer as a whole, the proportion of the polymerised allyl ammonium salt and the proportion of polymerised compound B respectively make up from 5 to 30 mole percent, and in that compound B corresponds to the following formula:

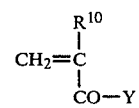

in which

R$^{10}$ represents hydrogen, an alkyl radical which may be substituted by a carboxyl or alkyloxy carbonyl group or by a carbamoyl group which may itself be substituted;

Y represents hydroxyl or an alkoxy or alkylamino radical which may be substituted by a solubilising group.

4. The process of producing a silver halide emulsion as claimed in claim 2 characterized in that in the copolymer R$^1$ represents hydrogen; C$_1$–C$_{12}$ alkyl, allyl or cyanoethyl;

R$^2$ to R$^5$ represent hydrogen;

R$^{10}$ represents hydrogen or methyl;

Y represents hydroxyl; and

An represents chloride, sulphate, methane sulphonate, benzene sulphonate, p-toluene sulphonate, methane phosphonate, monoalkyl methane phosphonate or trifluoracetate.

5. The process of producing a silver halide emulsion as claimed in claim 2 characterized in that in the copolymer polymerized units of an alkyl acrylate and/or methacrylate are additionally present in a quantity of from 5 to 25 mole percent.

6. The process of producing a silver halide emulsion as claimed in claim 2 characterized in that in the copolymer sulphur-containing compounds are additionally present in the copolymer.

7. The process of producing a silver halide emulsion as claimed in claim 2 characterized in that in the copolymer compound A is allyl amine hydrochloride and compound B is acrylic acid and/or methacrylic acid and in that from 5 to 25 mole percent of butyl acrylate, based on the polymer, are present in polymerised form.

* * * * *